United States Patent [19]
Gellekink

[11] Patent Number: 5,057,845
[45] Date of Patent: Oct. 15, 1991

[54] RADAR APPARATUS EMPLOYING DIFFERENT KINDS OF PULSES

[75] Inventor: Bernard Gellekink, Ootmarsum, Netherlands

[73] Assignee: Hollandse Signaalapparten, B.V., Hengelo, Netherlands

[21] Appl. No.: 601,591

[22] Filed: Oct. 18, 1990

Related U.S. Application Data

[63] Continuation of Ser. No. 497,811, Mar. 22, 1990, abandoned, which is a continuation of Ser. No. 289,649, Dec. 22, 1988, abandoned.

[30] Foreign Application Priority Data

Dec. 23, 1987 [GB] United Kingdom ................ 8730007

[51] Int. Cl.⁵ .............................................. G01S 9/10
[52] U.S. Cl. .................................... 342/137; 342/175
[58] Field of Search ................ 342/137, 175, 202, 204

[56] References Cited

U.S. PATENT DOCUMENTS

| | | |
|---|---|---|
| 3,452,352 | 6/1969 | Calhoun et al. . |
| 4,143,373 | 3/1979 | Chernick . |
| 4,303,920 | 12/1981 | Mortimer . |
| 4,562,438 | 12/1985 | Rouse et al. . |

Primary Examiner—Mark Hellner
Attorney, Agent, or Firm—Robert J. Kraus

[57] ABSTRACT

A radar apparatus which employs a pulse train containing an alternating sequence of first and second groups of pulses. The first group comprises a plurality of identical long pulses and the second group comprises a plurality of identical short pulses. The receiver has a single channel, the processing in which is successively adapted for the pulse returns of a group at any one time.

30 Claims, 2 Drawing Sheets

RADAR APPARATUS EMPLOYING DIFFERENT KINDS OF PULSES

This is a continuation of application Ser. No. 497,811 filed Mar. 22, 1990, now abandoned, which is a continuation of application Ser. No. 289,649, now abandoned, filed Dec. 22, 1988.

BACKGROUND OF THE INVENTION

This invention relates to a radar apparatus of the kind employing different type sof pulses. The invention also relates to a radar transmitter capable of generating different types of pulses and to a radar receiver for processing different types of pulses.

Radar pulse trains containing different types of pulses found particular application in radars seeking to achieve good detection at both long and short ranges. To this end it has become common practice to use long and short pulses for long and short range detection respectively. It has also become the practice to modulate the long pulses in a manner that allows the return pulse (i.e. the pulse when reflected from a target) to be compressed in the receiver. Pulse compression is well known and will not be discussed here. One form of pulse modulation is to sweep the pulse in frequency. More recently it has been proposed to modulate the short pulses also to allow short pulse returns to be compressed in the receiver.

Heretofore, the pulse train transmitted by the radar has been essentially a repeated pulse sequence with one long pulse and one or more short pulses. There is advantage in using a higher pulse repetition frequency (p.r.f.) for the short pulses. British patent specification GB 1,424,026 discloses an alternating long and short pulse sequence, that is the two types of pulses are at the same p.r.f. British patent specification GB-B 2,088,667 discloses a similar sequence in which the long and short pulses are sent as contiguous pulse pairs with the order of the pulses reversed in successive pairs to reduce the rate at which the means in the radar transmitter for generating the different types of pulses is switched. In this case the pulse pairs are well spaced in time.

SUMMARY OF THE INVENTION

The use of short pulses sent at a higher average rate than the long pulses is disclosed in British patent specifications GB 1,552,877 and GB-B 2,098,020. The latter discloses the concept of modulating the short pulses for compression. In practice the resultant pulse train comprises long pulses in each interval between which there are a plurality of short pulses. British patent specification GB-B 2,085,251 discloses in addition to the pulse pairs of GB-B 2,088,677 the use of pulse triplets in which each long pulse is preceded and succeeded by a contiguous short pulse. Thus although there are two pulses between successive long pulses, the triplet nature of the pulse sequence means that the triplets are relatively wide spaced in time and are essentially at the p.r.f. of the long pulses. The use of the preceding and succeeding short pulses is designed to ensure that returns from one of these pulses are detectable in the presence of various saturation effects discussed in that specification. British patent specification GB-B 2,085,252 also discloses the pulse pairs of GB-B 2,088,677. The pulse pairs may be part of a more extensive group of pulses, for example a pulse triplet as mentioned above, in which pulses within a group are more closely spaced in time than the interval between groups. The specification also discloses the possibility of inserting additional short pulses into these intervals between groups.

All the specifications mentioned above discuss pulse sequences designed to achieve a desired degree of performance as between short and long range detection having regard to the fact that returns of one type may mask returns of another type, that there is a need to distinguish target returns from clutter, and that the effects of possible saturation of the receiver may need to be mitigated. In the radar receivers disclosed in the specifications discussed above the returns are separated into two channels, for processing long and short pulse returns respectively.

There will be desoribed hereinafter a radar apparatus embodying the present invention which employs a pulse train containing an alternating sequence of first and second groups of pulses. The first group comprises a plurality of identical long pulses; the second comprises a plurality of identical short pulses. For some purposes interval between groups is made longer than the inter-pulse interval within each group, or at least the inter-pulse interval of the group preceding the given inter.-group interval. In other cases the groups are reported in adjacent fashion. That is the next group follows immediately after the inter-pulse intervals pertaining to the previous group. In either case the present proposal has the advantage that at any one time attention is concentrated on returns of one particular type.

In the radar apparatus to be described the receiver has a single channel the processing in which is successively adapted for the pulse returns of interest at any one time. A further feature is that the transmitter which includes the means for generating the first and second types of pulses in groups as mentioned above be arranged to modify pulse parameters within groups in dependence upon the target detection afforded by previous groups.

More broadly stated, the present invention provides in one aspect a radar apparatus of the kind empoying a pulse train comprising different types of pulses characterised by the pulse train including a first type of group of identical pulses and a subsequent second type of group of identical pulses.

In another aspect the invention provides a radar transmitter comprising a generator for generating a pulse train comprising pulses of different types characterised by means controlling the generator to generate a first type of group of identical pulses and a subsequent second type of group of identical pulses.

Examples of characteristics that may be chosen to distinguish one type of group from another are given below. These characteristics include not only those pertaining to the pulses themselves but to the intervals between pulses.

The invention still further provides a radar receiver for processing pulse returns from pulse groups of the kind defined above, characterised by means for detecting return pulses from both the first and second type of groups and processing means for the detected pulses arranged for processing pulse returns from the first type of group in a first period and pulse returns from pulses of the second group in a second period. It may be possible to implement the detection means for the receiver with the aid of a single receiver channel for all the groups of pulses.

Preferably the radar apparatus of the invention comprises the radar transmitter and receiver above defined and said control means is arranged to control the processing means such that said first and second processing periods are related in time to the generation of the first and second types of pulse groups.

In the embodiment of the invention to be discussed, the pulse train may comprise the first and second groups in a repeated sequence. More generally the pulse train may comprise a repeated sequence of a plurality of groups each of a different type, but within a given group the pulses are identical. With a two group sequence the pulses of the first and second groups may be long and short respectively as already discussed. The groups may be distinguished by other parameters or combinations of parameters including pulse length. The p.r.f. of the pulses within a group may be selected to best suit the range interval of target detection to which that group is directed.

One pulse parameter that is found in the embodiments to be described is the above.discussed technique of modulating a pulse to enable return echoes to be compressed in the receiver. In this specification the phrase "compression-modulated pulse", or equivalent, means a pulse subject to any form of modulation enabling the pulse to be subject to pulse compression in the receiver. Phase.coding and frequency sweeping (which itself can be regarded as a phase modulation) are forms of compression modulation and both of these will be referred to as phase modulation.

According to one embodiment of the invention, a generator is arranged to generate a group of relatively long identical pulses and a group of short identical pulses. In this embodiment the long pulses can be used primarily for long distance search, and the short pulses primarily for short distance search. In such an embodiment the p.r.f. of the short pulses is preferably greater than the p.r.f. of the long pulses. Preferably the long pulses are compression-modulated in order to improve the signal-to-noise ratio. Also the short pulses may be compression-modulated. Phase modulation, and more particularly frequency sweeping will be discussed. Preferably the search motion of the antenna is such that for each group type a target is illuminated 2-4 times by a group of pulses. In order to increase the data rate it is of advantage that the different groups of pulses be adjacent. However, under certain ambient conditions of the radar apparatus it is preferable that the interval between groups be greater than the interval between the pulses within a group. In this way the listening time of the last pulse of a group is increased. This means that the range of the radar apparatus is increased.

According to another embodiment of the invention it is possible to transmit three different groups of pulses alternately. A first group of pulses contains 8 compression-modulated long pulses for long distance search. A second group of pulses contains 8 compression-modulated short pulses with a higher p.r.f. than the p.r.f. of the long pulses for short distance search, and a third group of pulses contains 8 pulses whose length lies between the length of the long and the short pulses for mid.range search, the p.r.f. of the pulses of the third group being between the p.r.f. of the short and the long pulses.

According to another advantageous embodiment of the invention, it is possible to transmit different groups of pulses in which from group to group the pulse parameters are adapted in a predetermined manner.

These pulse parameters may be: pulse length and height, p.r.f., pulse spacing and phase modulation. This can be very useful as an anti.jamming measure.

According to another embodiment of the invention, it is possible to adapt the pulse parameters of pulses from group to group, in dependency on the received return signals of a transmitted group. Also the number of pulses in a group may be varied from group to group. For example, it is possible to decrease the pulse length of only one group of pulses in order to increase the resolution thereby limiting the necessary processing operations per second to the minimum necessary number. The receiver processor is adapted in accordance with the transmitted groups of pulses. In this manner it is also possible to avoid certain transmitter frequencies which are frequently jammed.

A special embodiment according to the invention is obtained when the interval between groups of pulses is greater than the interval of pulses within groups.

Because of the fact that a group of pulses contains pulses of the same type, it is possible to use only one receiver channel for that group. The receiver incorporates, according to a favourable embodiment of the invention, a receiver channel capable for operation on the return signals from all groups of pulses.

In this way, the problem of receiving different types of pulses is shifted to the processor. The processor processes one group of pulses a time. The fact that every group of pulses contains identical pulses makes it possible that the processor can be reprogrammed from group to group in oder to process the returns from a group of pulses. The processor may include a memory, wherein all sets of filter coefficients are stored to process the different groups of pulses respectively.

BRIEF DESCRIPTION OF THE DRAWING

The invention and its practice will now be described in more detail with reference to the accompanying drawings, in which.

DESCRIPTION OF THE PREFERRED EMBODIMENT

Figure 1:
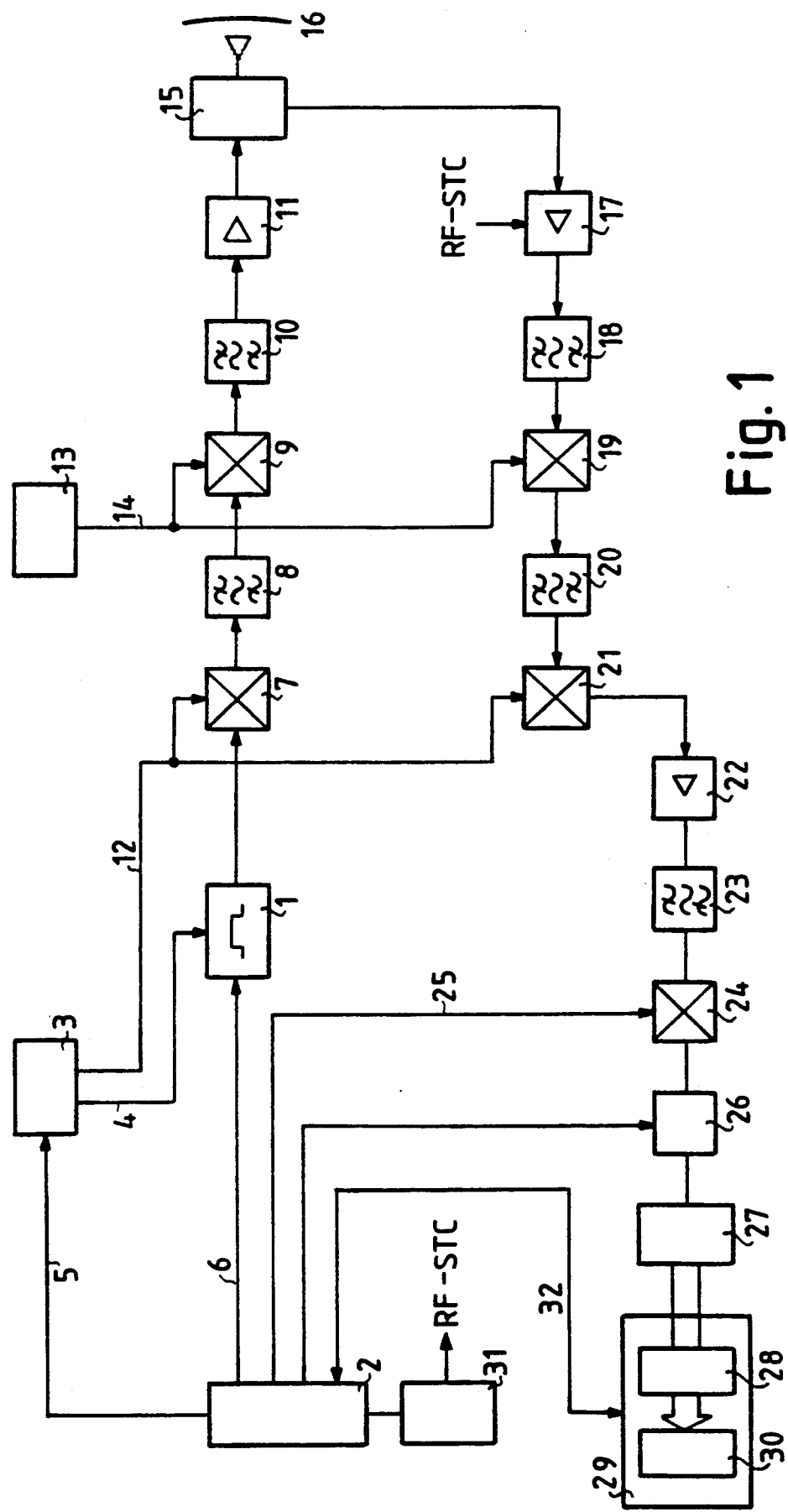
FIG. 1 illustrates a block diagram of an embodiment of a radar system according to the invention.

The radar system shown in FIG. 1 comprises a generator 1 for generating phase-modulated transmitter pulses of relatively long duration and phase-modulated transmitter pulses of relatively short duration.

The pulse generator 1 is controlled by a controlling and timing unit 2. The unit 2 decides what type of a pulse is transmitted. It is also possible that the generator 1 comprises separate generating units for generating phase-modulated pulses of relatively long duration and for generating phase-modulated pulses of relatively short duration.

Figure 2:
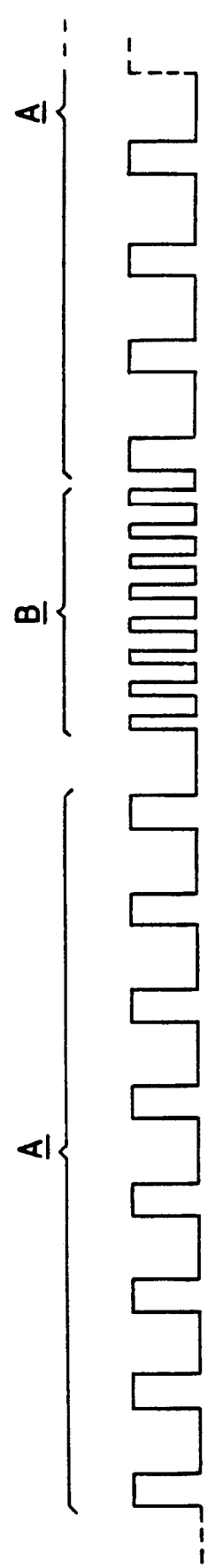
FIGS. 2 and 3 are explanatory diagrams of possible pulse sequences of this radar system.

The radar system further comprises a frequency synthesiser 3, determining the frequencies of the two kinds of transmitter pulses via line 4, whereby unit 2 controls the frequency synthesiser 3 via line 5. This unit 2 also determines the pulse repetition frequency of the transmitter pulses via line 6. The unit 2 generates signals on lines 5 and 6 in such a way that groups of eight long pulses (long groups A) and groups of eight short pulses (short groups B) are transmitted alternately as shown in FIG. 2. The interval between the pulses of a short group is preferably smaller than the interval between the pulses of a long group so as to obtain a better clutter suppression when the short pulses are used for short distance search. Moreover, a high data rate and a good resolution is now obtainable at short distance. The long pulses are used for long distance search. The interval between the pulses of a long group can be optimised in order to avoid second time.around echoes. Preferably the pulses of a long group are phase modulated in order to increase the range resolution at long distance search while it is Possible to use sufficient energy owing to the length of the long pulses, so that a longer distance search can be achieved. As described in GB-B 2,098,020, the short pulses may also be phase modulated in order to increase the length of the short pulses, whereby the range resolution at short distance can be maintained. The energy of the short pulses is enlarged relative to the short distance clutter energy. Realising that clutter is most prominent at short ranges the phase modulation applied to short pulses is most advantageous. Preferably, the number of groups transmitted per time unit is such that a target is illuminated by three groups of long Pulses and three groups of short pulses. In such a case a highly accurate estimation of the target azimuth can be made.

The transmitter pulses produced by the generat©r are fed in a common transmitter channel, in which the frequency of the transmitter pulses are stepwise transformed into the desired transmitter frequencies. The transmitter channel includes a first mixer 7, a first bandpass filter 8, a second mixer 9, a second bandpass filter 10 and an r.f. amplifier 11. In mixer 7 the two kinds of transmitter pulses are mixed with a signal supplied via line 12. 8andpass filter 8 transmits only the desired side frequencies of the output signals from mixer 7. In mixer 9 the signals passed through filter 8 are mixed with a signal of auxiliary oscillator 13 supplied via line 14. Similarly bandpass filter 9 transmits only the desired frequencies. The frequency of the oscillator 13 may be optimised for the double conversion receiving principle. The frequency of the frequency synthesiser 3 may be varied from group to group such that different groups of pulses are transmitted with a different frequency.

Both kinds of transmitter pulses are transmitted via the r.f. amplifier 11, a duplexer 15 and an antenna unit 16. The duplexer 15 comprises a ferrite circulator to separate the transmitter and receiver and a receiver isolator consisting of a TR tube. The return signals received by the antenna unit 16 are supplied to a receiver via the duplexer 15. The receiver includes a receiving channel, comprising an r.f. amplifier 17. a first bandpass filter 18, a mixer 19, a second bandpass filter 20, a mixer 21, an IF.amplifier 22 and a third bandpass filter 23. In this part of the receiving channel the frequencies of the return signals of a group of pulses are amplified and stepwise transformed into signals of the desired intermediate frequency. Since according to the described embodiment the frequency of the groups of pulses is changed from group to group, only one group of pulses will be received during a certain time interval (i.e. the listening time pertaining to the group concerned). In the embodiment here described the r.f. amplifier 17 is of the "low noise transistor amplifier" (LNTA) type. After filtering in bandpass filter 18, the amplified r.f. signals are applied to the mixer 19 and mixed with a signal supplied by oscillator 13 via line 14. The bandpass filter 20 retransmits the desired frequencies. The function of the bandpass filter 18 is to keep the noise generated in the wide band . LNTA outside the considerably narrower band of mixer 19. In mixer 21 these frequencies are subsequently transformed into an intermediate frequency level through the application of a signal supplied by the frequency synthesiser 3 via line 12. In the example, return signals from the long and the short duration transmitter pulses are obtained in the mixer 21, whereby the centre frequencies of these return signals are the same.

The IF-amplifier 22 and bandpass filter 23 transmit the desired intermediate frequency to a third mixer 24 for phase-sensitive detection. For this purpose the third mixer is also fed, via line 25, with the signal generated by the oscillator unit 2. The output signal of the mixer 24 is fed to an A/D converter 26. The sample frequency of the A/D converter 26 is determined by the unit 2 and approximately four times the frequency of the signal generated by the mixer 24. The digital output signal of the A/D converter is sent to a Hilbert filter 27 to derive digitised orthogonal I and Q components. For further processing, the digitised I and Q components are supplied to the input memory 28 of a video processing unit 29. Since a group of pulses contains only one type of pulses (8 phase-coded long pulses or 8 phase-coded short pulses) with a predetermined distance, height and phase coding, it is possible that only one receiver channel is used instead of (partly) double receiver channels adapted to the different type of pulses. In particular, this can be improved by designing the different groups and read in/read out process of the memory 28 in such a way that they make no difference to the processing hardware 30. To this end the processing unit 29 receives timing signals from the control unit 2 over line 32 whereby the pulse processing at any time may be adapted to the pulse group being transmitted as will now be described. As shown, information as to the signal returns being processed can also be sent to the control unit 2 in order to obtain the most advantageous operation of the radar system.

According to the conventional radar systems, the long and short pulses must be separated in the receiver since each long pulse is interspersed with one or more short pulses. In the pulse sequences above described, the received return signals from a group of pulses are processed in a manner adapted to the type of pulses of the received group. The processor includes an 8-pulse FIR (finite impulse response) filter of which the coefficients are programmable. The required sets of filter coefficients are stored in a memory. For each group including a specific kind of identical pulses, filter coefficients adapted to the type of pulses of the specific group are stored. This means that the different demands to receive the different types of pulses, which would normally lead to (partly) double receiver channels are shifted to the processor. It will be clear that the processor can be adapted alternately to one pulse type or the other when specific groups of identical pulses are received alternately.

Figure 3:
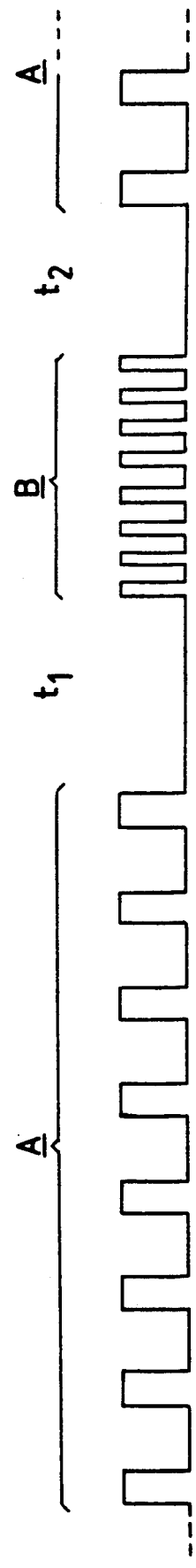

In order to increase the radar range it is possible to use groups of pulses which are spaced relatively wider $t_1$, $t_2$ than the pulses within a group or at least the pulses of the immediately preceding group, as is shown in FIG. 3. Now the last pulse of a group of pulses has an increased listening time. The processor will be programmed in such a manner that especially the last pulse of a group containing long pulses is used for long distance search.

In order to simplify the receiver and the transmitter it is also possible to omit the mixers 7 and 21. In this case, the desired transmitter frequencies are obtained by using only one mixer 9, while the desired intermediate frequency in the receiver is obtained by using only one mixer 20. However, the frequency generated by the frequency synthesiser 3 must be more accurate to obtain the same accuracy for the transmitter frequency derived by generating the transmitter frequency in two successive steps.

As already mentioned, the phase-modulated transmitter pulses of relatively short duration must have a short pulse length, such that the minimum range is acceptable, a good range.resolution is obtained, and the disadvantage of receiver desensitisation and weakening or masking of the desired targets in the event of a coincidence of signals from strong clutter and desired targets is mitigated. If, for example, the applied phase-modulated pulses of relatively short duration have a pulse length of 3 μsec and a compression ration of 6 is applied in the processor, the range resolution will be about 75 m and the minimum range about 450 m. The first return signals at minimum range will have stronger time side lobes because of the recovery time of the TR tube in the duplexer 15. This could be avoided by using a solid state RF switch as duplexer.

By replacing uncoded transmitter pulses of relatively short duration by phase-modulated transmitter pulses of short duration, an increased sensitivity of the receiver can be obtained. If, for example, the uncoded transmitter pulses have a pulse length of 1 μsec and the phase-modulated transmitter pulses a pulse length of 3 sensitivity increases by 6 to 8 dB. This means that, with the same signal.to.noise ratio, the dynamic range of the receiver is increased by 6 to 8 dB.

The radar system further comprises a sensitivity time control (STC) circuit 31, which provides the control signals RF-STC for the amplifier 17. The radio frequency STC for the amplifier 17 suppresses the gain of this amplifier to prevent saturation and non-linearities caused by strong nearby clutter. The above-mentioned increase of 6 to 8 dB of the sensitivity may be used to increase the amount of RF-STC applied to the amplifier 18.

It will be clear that the teachings of the invention are not limited to a search radar, but also may be applied in other kinds of radars, including a tracking radar.

I claim:

1. A radar apparatus for detecting objects, said apparatus comprising:
   a. a transmitter channel for transmitting successive groups of n pulses, all pulses in each group having an identical discriminating characteristic, and the respective discriminating characteristics of successive groups being dissimilar from each other;
   b. a receiver channel for receiving returns of said groups of pulses from the object, said receiver channel being continually adaptable to discriminably receive each of said groups of return pulses; and
   c. a signal processor connected to the receiver channel for adaptively processing the grups of return pulses in a way which depends on the type of groups of pulses received, said signal processor including an n-pulse programmable FIR filter.

2. Radar apparatus according to claim 1, characterised in that different types of pulses have different pulse parameters.

3. Radar apparatus according to claim 2, characterised in that different types of pulses have different pulse lengths.

4. Radar apparatus according to claim 1 characterised in that different types of pulses have different pulse heights.

5. Radar apparatus according to claim 1 characterised in that different types of pulses have different pulse modulation.

6. Radar apparatus according to claim 1 characterised in that different types of pulses have different frequencies.

7. Radar apparatus according to claim 1 characterised in that different types of pulses have different pulse repetition frequencies.

8. Radar apparatus according to claim 1 characterised in that the different groups of pulses contain the same number of pulses.

9. Radar apparatus according to claim 1 characterised in that different types of pulses have different pulse separations.

10. Radar apparatus according to claim 1 characterised in that a first type of group of pulses comprises pulses of relatively long duration and said subsequent type of group of pulses comprises pulses of relatively short duration.

11. Radar apparatus according to claim 1 characterised in that a predetermined number of consecutive groups have pulses with the same pulse repetition frequency.

12. Radar apparatus according to claim 1 characterised in that the pulses of some groups are compression. modulated.

13. Radar apparatus according to claim 10, characterised in that said long pulses are compression-modulated.

14. Radar apparatus according to claim 10, characterised in that said short pulses are compression-modulated.

15. Radar apparatus according to claim 10, characterised in that said long and short pulses are phase-modulated.

16. Radar apparatus according to claim 15, characterised in that said long and short pulses are phase-modulated in a different way.

17. Radar apparatus according to claim 1 characterised in that some different types of groups have a different type of phase modulation.

18. Radar apparatus according to claim 1 characterised in that some predetermined sequences of groups have a different phase modulation.

19. Radar apparatus according to claim 11, characterised in that said pulses have the same phase modulation.

20. Radar apparatus according to claim 17 characterised in that the phase modulation comprises a frequency sweep.

21. Radar apparatus according to claim 1 characterised in that the radar apparatus is suitable for transmitting three different types of groups of identical pulses respectively.

22. Radar apparatus according to claim 1 characterised in that the radar apparatus is adapted to transmit different groups of pulses whereby from group to group the pulse parameters are adapted in a predetermined manner.

23. Radar apparatus according to claim 1 characterised in that the radar apparatus is arranged to adapt the pulse parameters of pulses from group to group, in dependency of the received return signals of a transmitted group.

24. Radar apparatus according to claim 1 characterised in that the interval between next adjacent groups of pulses is greater than the interval of the pulses within the earlier of these groups.

25. Radar apparatus according to claim 1 characterized in that the groups of pulses are adjacent.

26. Radar apparatus according to claim 1, characterized in that the signal processor incorporates a programmable pulse compression filter.

27. Radar apparatus according to any of the claims 1 or 26, characterised in that the processor incorporates a Hilbert filter.

28. Radar apparatus according to claim 1, characterized in that the processor is programmed in dependence of the received type of group of pulses.

29. An apparatus as in claim 1 comprising a generator for generating a train of pulses of different types characterized by means for controlling the generator to generate a first type of group of identical pulses and a subsequent second type of group of identical pulses.

30. An apparatus as in claim 29, characterized by means for detecting return pulses from both the first and second type of grups and processing means for the detected pulses arranged for processing pulse returns from the first type of group in a first period and pulse returns from pulses of the second group in a second period.

* * * * *